United States Patent
Hashiguchi (10) Patent No.: US 9,210,325 B2
(45) Date of Patent: Dec. 8, 2015

(54) VIDEO SIGNAL AND TALLY SIGNAL SWITCHER SYSTEM

(75) Inventor: Kentaro Hashiguchi, Tsushima (JP)

(73) Assignee: Nihon Video System Co., Ltd., Tsushima-shi (JP)

( * ) Notice: Subject to any disclaimer, the term of this patent is extended or adjusted under 35 U.S.C. 154(b) by 208 days.

(21) Appl. No.: 13/812,352

(22) PCT Filed: Jul. 27, 2011

(86) PCT No.: PCT/JP2011/067050
§ 371 (c)(1),
(2), (4) Date: Jan. 25, 2013

(87) PCT Pub. No.: WO2012/014917
PCT Pub. Date: Feb. 2, 2012

(65) Prior Publication Data
US 2013/0120633 A1    May 16, 2013

(30) Foreign Application Priority Data

Jul. 29, 2010  (JP) ................................ 2010-170689
Oct. 19, 2010  (JP) ................................ 2010-234487

(51) Int. Cl.
H04N 5/222 (2006.01)
H04N 5/232 (2006.01)
H04N 5/268 (2006.01)
H04N 5/247 (2006.01)

(52) U.S. Cl.
CPC .......... *H04N 5/23293* (2013.01); *H04N 5/247* (2013.01); *H04N 5/268* (2013.01)

(58) Field of Classification Search
CPC .... H04N 5/23293; H04N 5/247; H04N 5/268
USPC .......... 348/207.99, 374, 705, 333.01–333.12
See application file for complete search history.

(56) References Cited

U.S. PATENT DOCUMENTS

| | | | | |
|---|---|---|---|---|
| 5,450,140 | A * | 9/1995 | Washino | 348/722 |
| 6,466,275 | B1 * | 10/2002 | Honey et al. | 348/722 |
| 6,816,205 | B2 * | 11/2004 | Dudkowski | 348/705 |
| 7,391,874 | B1 * | 6/2008 | Semmes et al. | 381/119 |
| 7,830,413 | B2 * | 11/2010 | McKain et al. | 348/207.99 |
| 7,859,137 | B2 * | 12/2010 | Winans | 307/147 |
| 2008/0074343 | A1 * | 3/2008 | Sasser et al. | 345/1.1 |

FOREIGN PATENT DOCUMENTS

| JP | 10-285438 A | 10/1998 |
|---|---|---|
| JP | 2008-205538 A | 9/2008 |
| JP | 2010-004507 A | 1/2010 |

OTHER PUBLICATIONS

International Search Report mailed Oct. 25, 2011, issued in corresponding International Application No. PCT/JP2011/067050, filed Jul. 27, 2011, 2 pages.

* cited by examiner

*Primary Examiner* — Tuan Ho
*Assistant Examiner* — Selam Gebriel
(74) *Attorney, Agent, or Firm* — Christensen O'Connor Johnson Kindness PLLC (57) ABSTRACT

Relating to a switcher system that is capable of reducing time and trouble of setting video equipment. According to the present invention, there is provided a switcher system having a switcher and a plurality of view finders. The switcher outputs a digital video signal having a tally signal superimposed thereon. Each of the view finders has an external digital video input unit, which receives input of the digital video signal, and a tally display control unit, which controls tally display based on the tally signal superimposed on the digital video signal.

10 Claims, 11 Drawing Sheets

VIDEO SIGNAL AND TALLY SIGNAL SWITCHER SYSTEM

TECHNICAL FIELD

The present invention relates to a switcher system having a switcher and multiple view finders, and relates to the view finder preferably used in the switcher system.

BACKGROUND ART

In general, multiple video cameras for broadcasting are connected to a switcher while taking video for the television broadcasting. An operator of the switcher selects the video camera, video of which is to be employed for broadcasting, while viewing videos of the multiple video cameras. The production of an interesting TV program requires one video that zooms in on a broadcasting object and also another video of an entire broadcasting scene in order to add the realism of the site, in contrast. In order for each video camera operator to send various videos to the switcher based on his/her own judgment, there is needed a function that enables the video camera operator to easily check the video selected by the switcher. If the above function is available, the video camera operator easily takes video that is different from the video selectively employed by the switcher. Thus, a broadcasting video camera, in general, is capable of receiving return video from the switcher, and has a zoom remote controller connector, which is mounted on a return button of a lens attached to the video camera or which is mounted on a lens connected to the video camera. The zoom remote controller connector enables a function, in which the pressing of the return button through the lens attached to the video camera switches the video display of the view finder between the currently taking video and the return video from the switcher.

SUMMARY OF THE INVENTION

Problems to be Solved by the Invention

When the multiple video cameras and the switcher are employed for the video taking, separate respective wires for the video signal, the return signal, the tally signal, and the intercom signal are required between each video camera and the switcher. Therefore, setting of the video equipment has required time and trouble very much.

The present invention is made in view of the above situation, and thereby relates to a switcher system that is capable of reducing time and trouble of setting video equipment.

Means for Solving the Problems

According to the present invention, there is provided a switcher system includes a switcher and a plurality of view finders, wherein: the switcher outputs a digital video signal having a tally signal superimposed thereon; and each of the view finders has an external digital video input unit that receives input of the digital video signal, and a tally display control unit that controls tally display based on the tally signal superimposed on the digital video signal.

In the present invention, the switcher outputs the digital video signal having the tally signal superimposed thereon, and the view finder controls the tally display based on the tally signal included in the digital video signal (e.g. the view finder switches the operation between on and off of the tally lamp, or determines emitting color of the tally lamp). As a result, it is possible to share the wire for both of the video signal and for the tally signal, and thereby reducing time and trouble of setting the video equipment.

The switcher preferably has a digital video input unit, a video selecting unit, a signal superimposing unit, and a digital video output unit. The digital video input unit receives input of digital video signals outputted by a plurality of video cameras. The video selecting unit selects one of the digital video signals received by the digital video input unit. The signal superimposing unit superimposes the tally signal, which has an identifier, on the digital video signal selected by the video selecting unit. The digital video output unit outputs the digital video signal having the tally signal superimposed thereon. The identifier is preferably an identifier of the video camera that outputs the digital video signal. Preferably, each of the view finders further includes a storage unit that stores an identifier thereof, and the tally display control unit turns on the tally display when the identifier within the tally signal coincides with the identifier stored in the storage unit. Due to the above configuration, it is possible to turn on the tally display only for the view finder that corresponds to the identifier included in the tally signal. The "identifier" may be, for example, a number or a symbol, and is recognizable by the view finder. The identifier may be unique to the view finder, and may be flexibly set and changed.

Preferably, each of the view finders includes a signal separating unit that separates the tally signal from the digital video signal, and the tally display control unit of the view finder controls the tally display based on the separated tally signal.

Preferably, the switcher further includes a control signal input unit that receives input of the control signal, The video selecting unit selects the digital video signal based on the return signal. Due to the above configuration, the video camera operator is capable of remote-operating the switcher, and thereby enabling one operator to operate two cameras. Also, in one example, the control signal input unit receives input of the control signal having the return signal, and the switcher further includes a control signal output unit that outputs the control signal, from which the return signal is removed. The control signal outputted from the control signal output unit is received by the video camera (preferably, a zoom lens of the video camera). In the above case, a single remote controller is employed to operate the switcher and the video camera.

Preferably, the tally signal has emitting color information, and the tally display control unit controls emitting color of the tally display based on the emitting color information. In the above case, without providing multiple wires for the tally signal, it is possible to realize the tally display with multiple colors.

In one example, the digital video signal is an SDI signal (e.g. an HD-SDI signal, an SD-SDI, a 3G-SDI signal). Note that, the digital video signal may be a digital signal of other types (such as HDMI signal, 3D).

Preferably, the switcher further has an audio input unit that receives input of an audio signal, the switcher has a signal superimposing unit that superimposes the audio signal on the digital video signal, the switcher has a digital video output unit that outputs the digital video signal having the tally signal and the audio signal superimposed thereon, and each of the view finders further has an audio output unit that outputs audio based on the audio signal superimposed on the digital video signal.

Furthermore, preferably, each of the view finders has a camera digital video input unit, an audio input unit, a signal superimposing unit, and a camera digital video output unit. The camera digital video input unit receives input of a digital video signal from a video camera. The audio input unit receives input of an audio signal. The signal superimposing unit superimposes the audio signal on the digital video signal. The camera digital video output unit outputs the digital video signal having the audio signal superimposed thereon. The switcher further has an audio output unit that outputs audio based on the audio signal superimposed on the digital video signal.

The audio signal is, for example, an intercom audio, and due to the above configuration, it is possible to realize the intercom system without having additional wiring. Because the digital signal is superimposed on the digital video signal, and the analog signal is outputted as audio, an AD converting unit and a DA converting unit are provided as required. Also, each of the view finders may further has a signal separating unit that separates the audio signal from the digital video signal. The switcher may further include a signal separating unit that separates the audio signal from the digital video signal.

In one example, the external digital video input unit has a BNC connector. The system of the present embodiment is realized with the above general connector.

Preferably, each of the view finders has a camera digital video input unit, a control signal input unit, a video selecting unit, and a display control unit. The camera digital video input unit receives input of a digital video signal from a video camera. The control signal input unit receives input of a control signal. The video selecting unit selects, based on the control signal, one of video based on the digital video signal received from the video camera and video based on the digital video signal received through the external digital video input unit. The display control unit controls display of the video selected by the video selecting unit. In the above case, by feeding the control signal to the view finder, it is possible to easily control select and display one of the video from the video camera and the video from the switcher.

EMBODIMENT CARRYING OUT THE INVENTION

1. Switcher System

A switcher system of one embodiment of the present invention will be described below with reference to FIG. 1 to FIG. 13.

1-1. Overview of Switcher System

Figure 1:
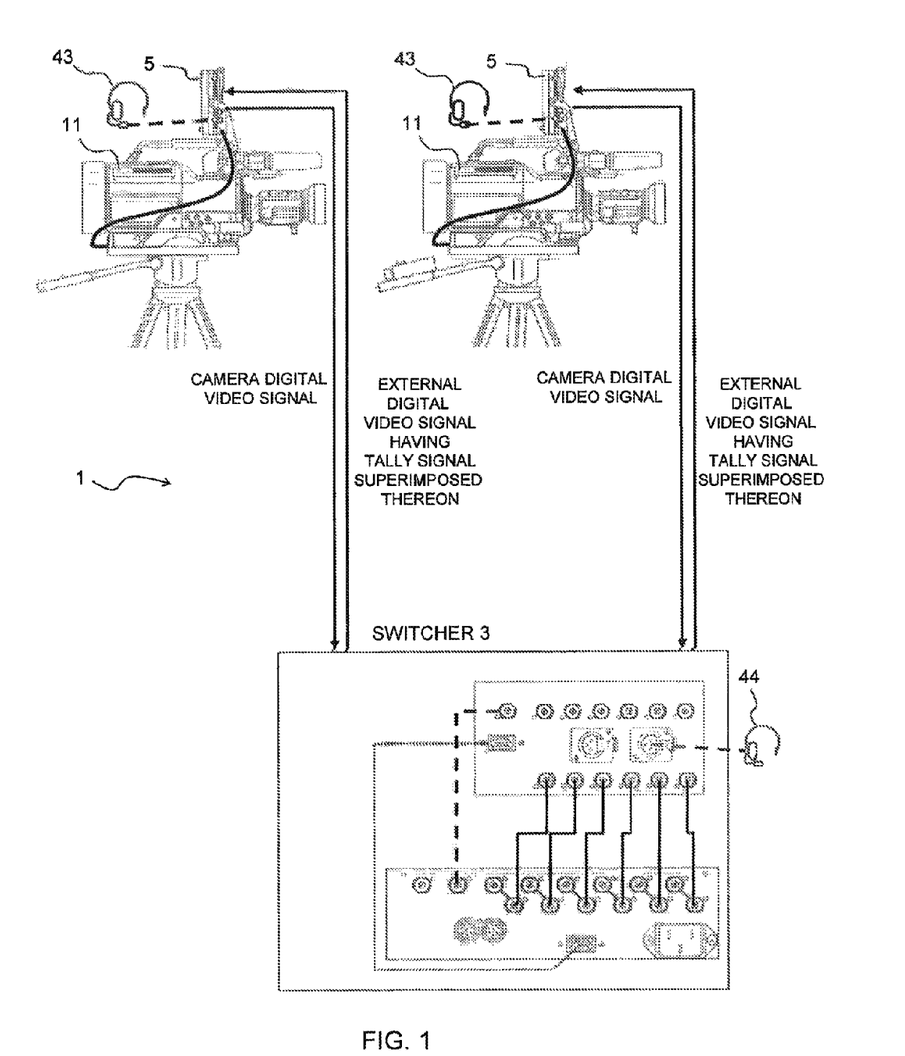
FIG. 1 is a configuration diagram illustrating an overview of a switcher system of one embodiment of the present invention.

FIG. 1 illustrates an overview of a switcher system 1 of the present embodiment. FIG. 1 illustrates only minimum wirings for the convenience in the drawing. As shown in FIG. 1, the switcher system of the present embodiment includes a switcher 3 and multiple view finders 5. In the present embodiment, the switcher 3 connects two apparatuses through wires as shown in FIG. 1 so as to make the apparatuses function as a single switcher. Alternatively, the switcher 3 may be a single apparatus having all of the function.

The switcher 3 is configured to receive camera digital video signals from multiple video cameras 11, and each video camera 11 has a view finder 5.

The switcher 3 selects one of the camera digital video signals from the multiple video cameras 11, superimposes a tally signal on the selected digital video signal, and then outputs the superimposed digital video signal as an external digital video signal. Although, additional cable was wired for the transmission of the tally signal conventionally, the cable for the tally signal is not needed in the present embodiment because the tally signal is transmitted through the cable for the video signal.

Also, the view finder 5 and the switcher 3 are connected with audio input/output units 43, 44 (e.g. headset), respectively. Audio received by the audio input/output unit 43 is superimposed on a camera digital video signal and is transmitted to the switcher 3. Then, the switcher separates the audio signal from the received signal, and the audio signal is outputted to the audio input/output unit 44. Similarly, audio received by the audio input/output unit 44 is superimposed on the external digital video signal and is transmitted to the view finder 5. Then, the view finder 5 separates the audio signal from the received signal, and is transmitted to the audio input/output unit 43. As above, the cable for the audio signal is not needed because the audio signal is transmitted through the cable for the video signal.

The tally signal is superimposed on the external digital video signal outputted by the switcher 3. The view finder 5 separates the tally signal from the received external digital video signal, and controls tally display based on the tally signal.

The switcher 3 may output digital video signals, which have mutually different tally signals, to the multiple view finders 5. Also, the switcher 3 may output digital video signals, which have the mutually equivalent tally signals, to the view finders 5.

In a former case, the tally signal to command the tally display to turn on is given only to the view finder 5, which is to turn on the tally display. However, another tally signal to command the tally display to turn off is given to other view finder 5 different from the above finder.

In a latter case, the tally signal includes the identifier, and the view finder 5 controls the tally display based on the tally signal when the identifier within the tally signal coincides with the identifier of the view finder 5. There will be made an explanation of an example, where six video cameras 11 are connected with the switcher 3, as below. Identifiers for six video cameras 11 are, for example, 1, 2, 3, 4, 5, and 6. The view finder 5 mounted on each video camera 11 is assigned with the identifier that is equivalent to the identifier of the mounting video camera. Examples of the tally signals from the switcher 3 include, for example, a tally signal (hereinafter, "first tally signal"), which indicates "video is currently in use", and another tally signal (hereinafter, "second tally signal"), which indicates "video is scheduled to be used next". Each tally signal has the identifier. For example, in a case, where the video of the video camera 11 with the identifier of 2 is currently in use, and the video of the video camera 11 with the identifier of 4 will be used next, the first tally signal is assigned with the identifier of 2, and the second tally signal is assigned with the identifier of 4. The digital video signals having the above tally signals are inputted into all the view finders 5 from the switcher 3. The view finder 5 reads the identifier in the tally signal to determine whether the identifier in the tally signal coincides with the identifier of the view finders 5. When the identifier in the tally signal coincides with the identifier of the view finders 5, the view finder 5 executes the tally display based on the tally signal. For example, the view finder 5 with the identifier of 1 does not executes the tally display because both the first tally signal and the second tally signal do not coincide with the identifier thereof. In contrast, the view finder 5 with the identifier of 2 turns on the red light for the tally display, for example, when the view finder 5 confirms that the identifier of the first tally signal is 2. Also, the view finder 5 with the identifier of 4 turns on the green light for the tally display, for example, when the view finder 5 confirms that the identifier of the second tally signal is 4.

1-2. Details of Switcher System

The switcher system 1 of the present embodiment will be detailed below.

(1) View Finder 5 and Video Camera 11

The view finder 5 and the video camera 11 used in the switcher system 1 will be described with reference to FIG. 2 to FIG. 5.

Figure 2:
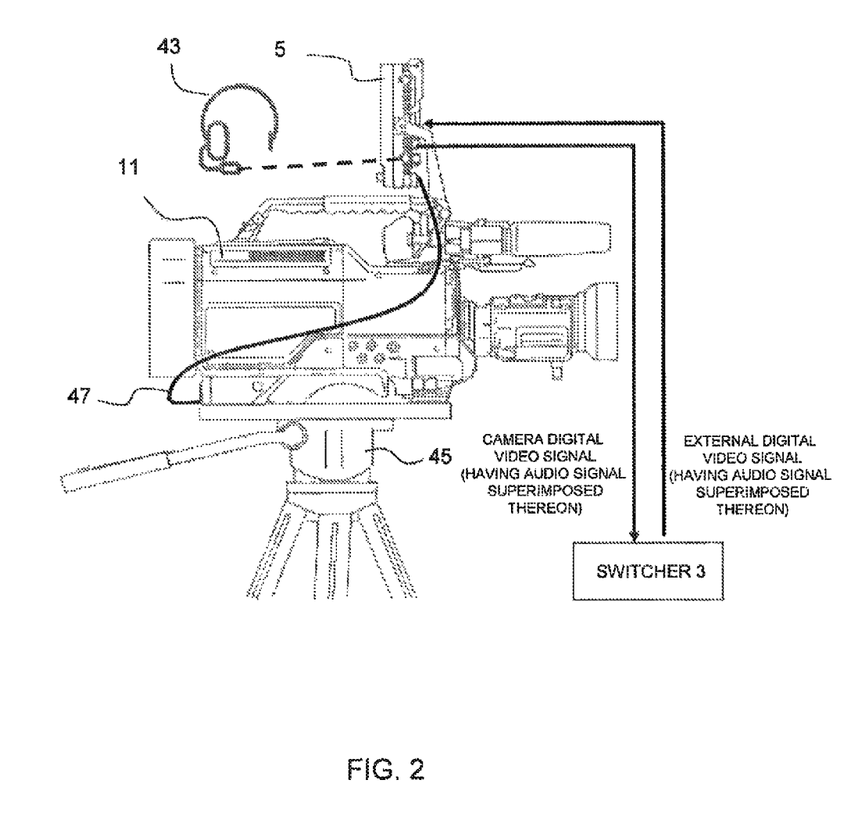
FIG. 2 is a connection diagram illustrating a configuration of a view finder and a camera of the switcher system in FIG. 1.

As shown in FIG. 2, the video camera 11 is mounted on a tripod 45, and the view finder 5 is mounted on the video camera 11. The video camera 11 and the view finder 5 are mountable in any mounting method that is not limited to the method shown here, and thereby the video camera 11 and the view finder 5 may be mounted by other method. For example, one end of a plate adaptor may be fixed between the video camera 11 and the tripod 45, and the other end of the adaptor may be fixed to the view finder 5. In the above case, the video camera 11 is successfully prevented from shaking. A video signal outputted from the video camera 11 (e.g. an SDI signal outputted from a SDI output connector) is received by the view finder 5 through a cable 47. Also, although not shown in the drawings, it is possible to supply power to the view finder 5 from the video camera 11 through the cable. Furthermore, the view finder 5 is connected with the audio input/output unit 43 (e.g. a headset). As will be described later, the audio signal received from the audio input/output unit 43 is superimposed on the video signal outputted from the video camera 11, and then is outputted to the switcher 3. Also, in a case, where the video signal received from the switcher 3 has the audio signal superimposed thereon, the audio signal is separated from the received video signal and is outputted through the audio input/output unit 43.

Figure 3A:
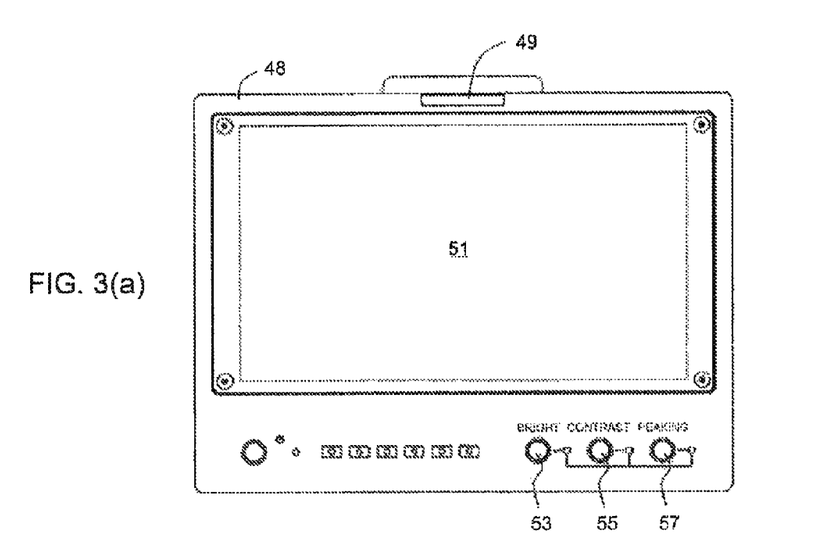
FIG. 3(a) is a front view of the view finder of the switcher system in FIG. 1.
Figure 3B:
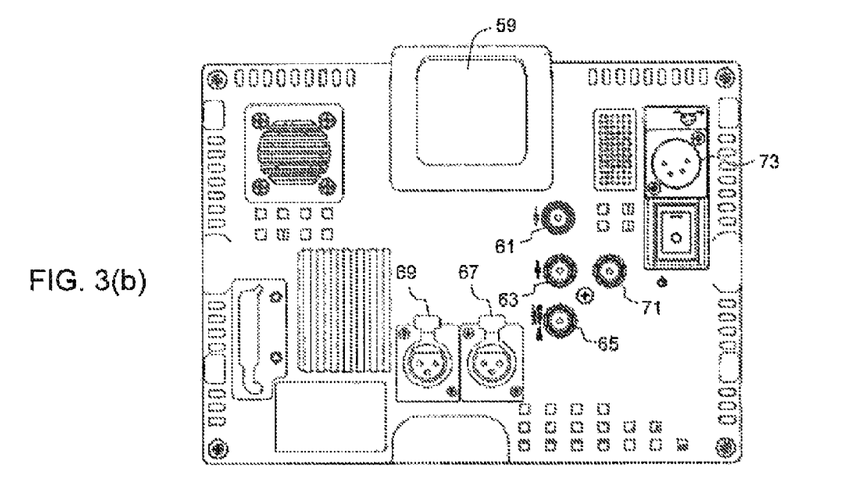
FIG. 3(b) is a rear view of the view finder of the switcher system in FIG. 1.

Next, an appearance and a connector arrangement of the view finder 5 will be described with reference to FIGS. 3(a) and 3(b). FIGS. 3(a) and 3(b) are a front view and a rear view of the view finder 5, respectively.

As shown in FIG. 3(a), the view finder 5 has a box-shaped main body unit 48, which includes a liquid crystal display unit 51, a tally display unit 49, a brightness adjustor 53, a contrast adjustor 55, and a peaking adjustor 57 on a front side. Also, as shown in FIG. 3(b), the view finder 5 has, on a back side, a tally display unit 59, a camera digital video input connector 63, an external digital video (a return video from the switcher) input connector 65, a tally input connector 71, a power source input terminal 73, an analog audio connectors 67, 69, and a camera digital video output connector 61. The power source input terminal 73 is connected with a power source cable from the video camera 11. Although the tally input connector 71 is omissible, the tally input connector 71 is employed to connect with an additional cable for the tally signal, if the switcher 3 is designed so as not to output the digital video signal with the tally signal superimposed thereon. A video input connector/video output connector has, for example, a BNC connector.

Figure 4:
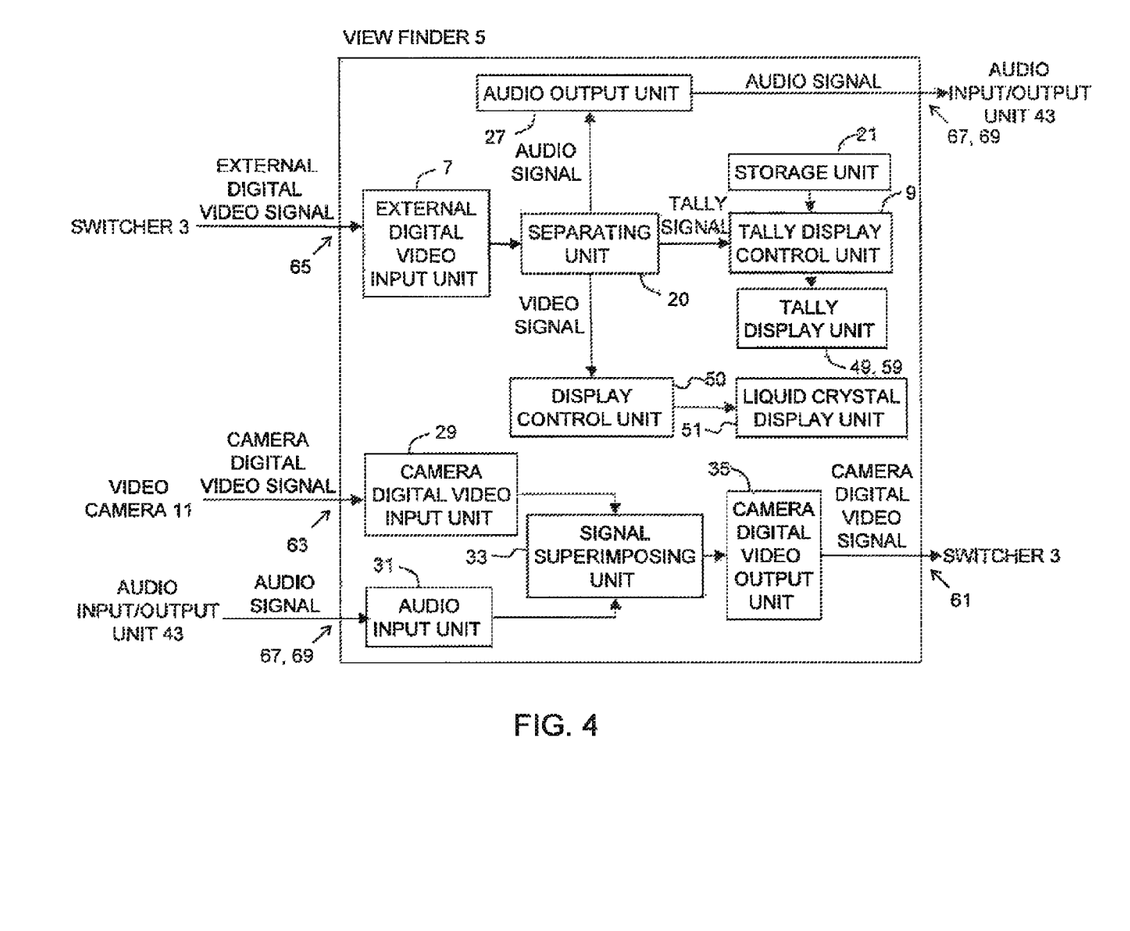
FIG. 4 is a block diagram illustrating an internal configuration of the view finder of the switcher system in FIG. 1.

Next, an internal configuration of the view finder 5 will be described with reference to FIG. 4. As shown in FIG. 4, the view finder 5 includes an external digital video input unit 7, which receives input of external digital video signals from the switcher 3, and the external digital video input unit 7 receives the external digital video signals through the external digital video input connector 65. The tally signal, which has the identifier, and the audio signal are superimposed on the external digital video signal, and a separating unit 20 separates the video signal, the tally signal, and the audio signal from each other. The video signal is transmitted to a display control unit 50, and the display control unit 50 controls the display of the liquid crystal display unit 51 based on the video signal. The display control unit 50 displays the video based on the levels of the brightness, the contrast, and the peaking, which are adjusted by the brightness adjustor 53, the contrast adjustor 55, and the peaking adjustor 57. The tally signal is transmitted to a tally display control unit 9. In the present embodiment, the tally signal includes the identifier, and the tally display control unit 9 checks the identifier within the tally signal against an identifier stored in a storage unit 21. When the identifiers coincide with each other, the tally display control unit 9 controls the turning on of the tally display units 49, 59 based on the tally signal. Thus, the storage unit 21 stores, in advance, an identifier (e.g. ID number) of the video camera 11, to which the view finder 5 is attached. Also, the tally signal may alternatively include emitting color information, and a light color of the tally display units 49, 59 may be changed based on the information. When the tally signal does not include any identifier, the tally display control unit 9 controls the turning on of the tally display units 49, 59 based on the tally signal. In the above case, the storage unit 21 is not needed.

The audio signal is transmitted to an audio output unit 27, and analog audio signals, which are obtained through DA conversion, are outputted through analog connectors 67, 69 to the audio input/output unit 43. Due to the above configuration, a single signal line enables the transmission of the video signal, the tally signal, and the audio signal, and thereby saving trouble of wiring on site.

Also, the view finder 5 has a camera digital video input unit 29, which receives input of the digital video signal from the video camera 11, and the camera digital video input unit 29 receives the camera digital video signals through the camera digital video input connector 63. Also, the view finder 5 has an audio input unit 31, which receives input of the audio signals, and the audio input unit 31 receives the audio signals through the analog audio connectors 67, 69. The inputted audio signal is AD-converted by a signal superimposing unit 33, and is superimposed on the camera digital video signal. Then, the superimposed video signal is outputted to the exterior by a camera digital video output unit 35 through the camera digital video output connector 61. The outputted signal is transmitted to the switcher 3. Due to the above configuration, a single signal line enables the transmission of the video signal and the audio signal, and thereby saving trouble of wiring on site.

Figure 5:
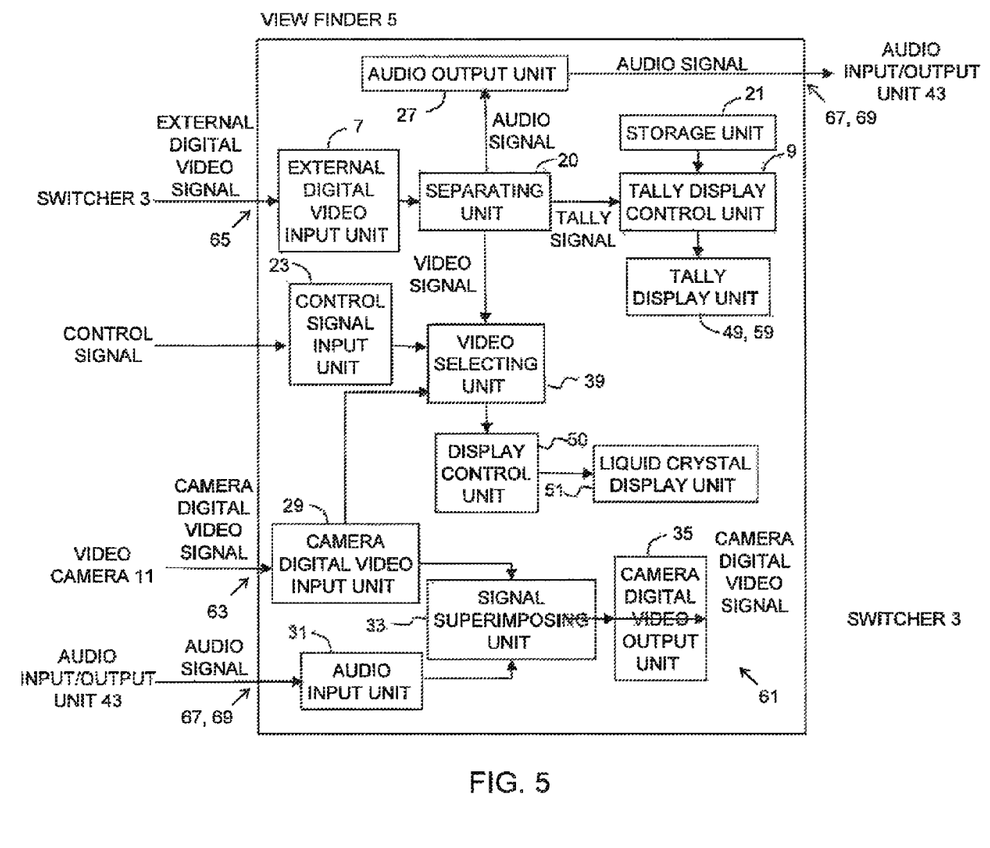
FIG. 5 is a block diagram illustrating another example of the internal configuration of the view finder of the switcher system in FIG. 1.

Note that, although the present embodiment illustrates the example, in which the video of the external digital video signal is directly displayed in the liquid crystal display unit 51, it may be alternatively configured such that the video of the external digital video signal and the video of the camera digital video signal are selectively switched as required because the view finder 5 receives both the external digital video signal and the camera digital video signal. In order to achieve the above function, as shown in FIG. 5, there are provided a control signal input unit 23, which receives input of the control signal, a video selecting unit 39, which selects, based on the control signal, the video based on the digital video signal from the video camera 11, and the video based on the digital video signal from the external digital video input unit 7, and the display control unit 50, which controls the display of the video selected by the video selecting unit 39.

(2) Switcher 3

Next, the switcher 3 used in the switcher system 1 will be described with reference to FIG. 6.

Figure 6:
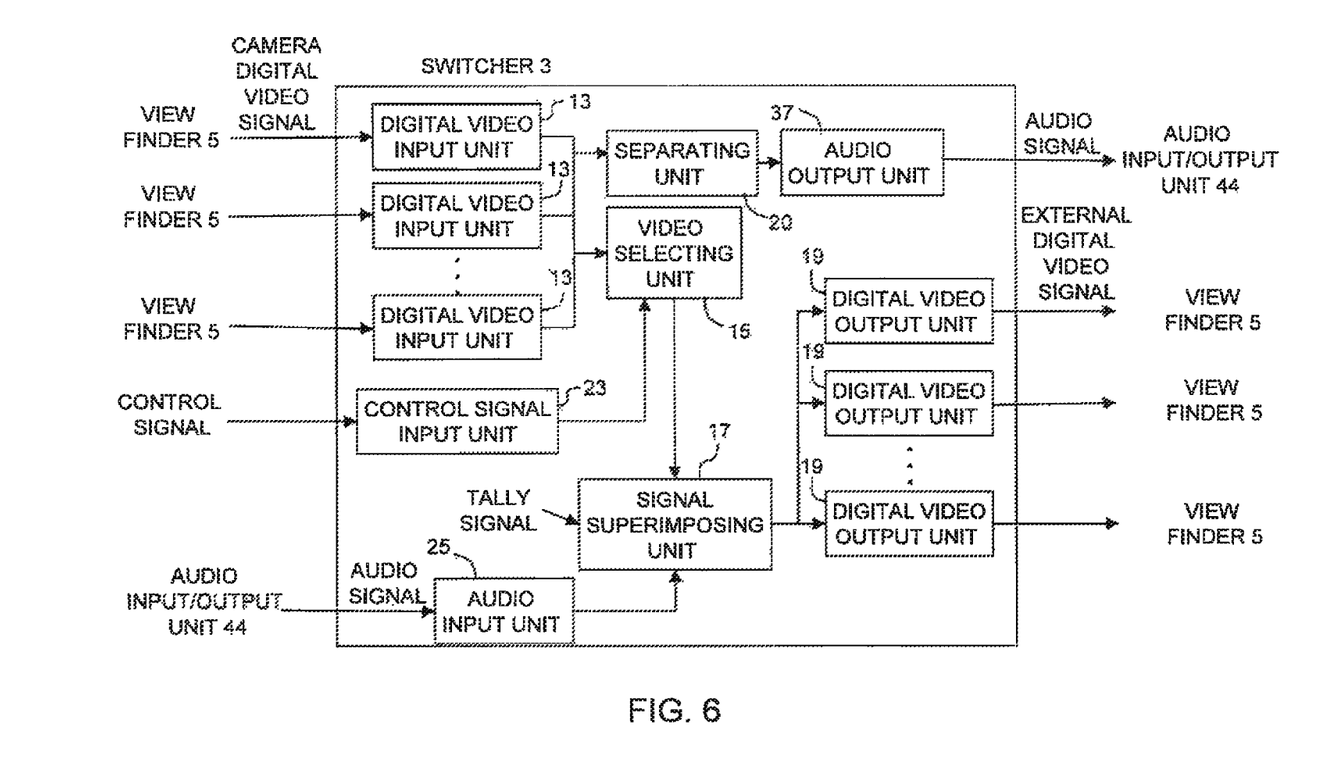
FIG. 6 is a block diagram は, illustrating an internal configuration of the switcher of the switcher system in FIG. 1.

As shown in FIG. 6, the switcher 3 includes digital video input units 13, which receive input of multiple camera digital video signals, a video selecting unit 15, a signal superimposing unit 17, a digital video output unit 19, an audio input unit 25, the separating unit 20, an audio output unit 37, and the control signal input unit 23. The camera digital video signal is a video signal from the video camera 11, and is usually inputted into the switcher 3 after the view finder 5 has superimposed the audio signal on the video signal. The video selecting unit 15 selects one of the multiple camera digital video signals, and transmits the selected camera digital video signal to the signal superimposing unit 17. The video, which is selected by the video selecting unit 15, is determined in the operation panel of the switcher 3 shown in FIG. 7, by using a program row camera 1 selection button x1 to a program row camera 6 selection button x6, and a preview row camera 1 selection button y1 to a preview row camera 6 selection button y6. For example, when the program row camera 2 selection button x2 is pressed, the video of the video camera 11 with the identifier of 2 is selected. In the above case, the tally signal having the identifier of 2 is generated, and the signal superimposing unit 17 superimposes the tally signal on the camera digital video signal. The analog audio signal from the audio input/output unit 44 is inputted to the audio input unit 25, and is AD-converted. Then, the signal superimposing unit 17 superimposes the converted signal on the digital video signal. The digital video signal having the tally signal and the audio signal superimposed thereon is outputted from the digital video output unit 19 to the view finder 5 as the external digital video signal. Due to the above configuration, it is possible to transmit the video signal, the tally signal, and the audio signal to the view finder 5 by using the single signal line.

Also, each camera digital video signal is transmitted to the separating unit 20, and the audio signal is separated from the video signal. The separated audio signal is DA-converted, and is outputted from the audio output unit 37 to the audio input/output unit 44. As a result, it is possible to listen to the audio from the view finder 5.

Figure 7:
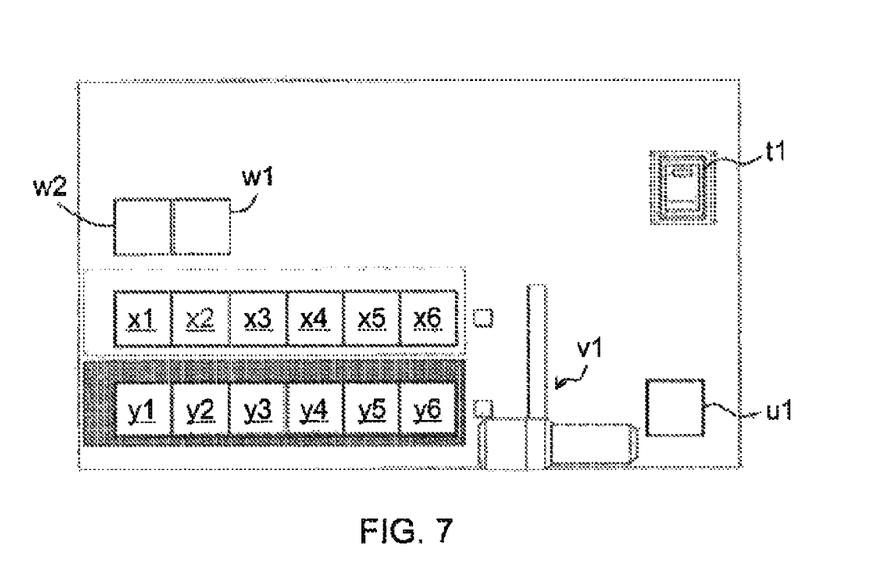
FIG. 7 is a block diagram illustrating an operation panel of the switcher of the switcher system in FIG. 1.

The video selected by the video selecting unit 15 is determined by a method other than the operation panel shown in FIG. 7. The video selected by the video selecting unit 15 may be determined by inputting an external control signal into the control signal input unit 23.

1-3. Specific Configuration of Switcher System

Next, a further concrete configuration of the switcher system of the present invention will be described with reference to FIG. 8 to FIG. 12.

Figure 8:
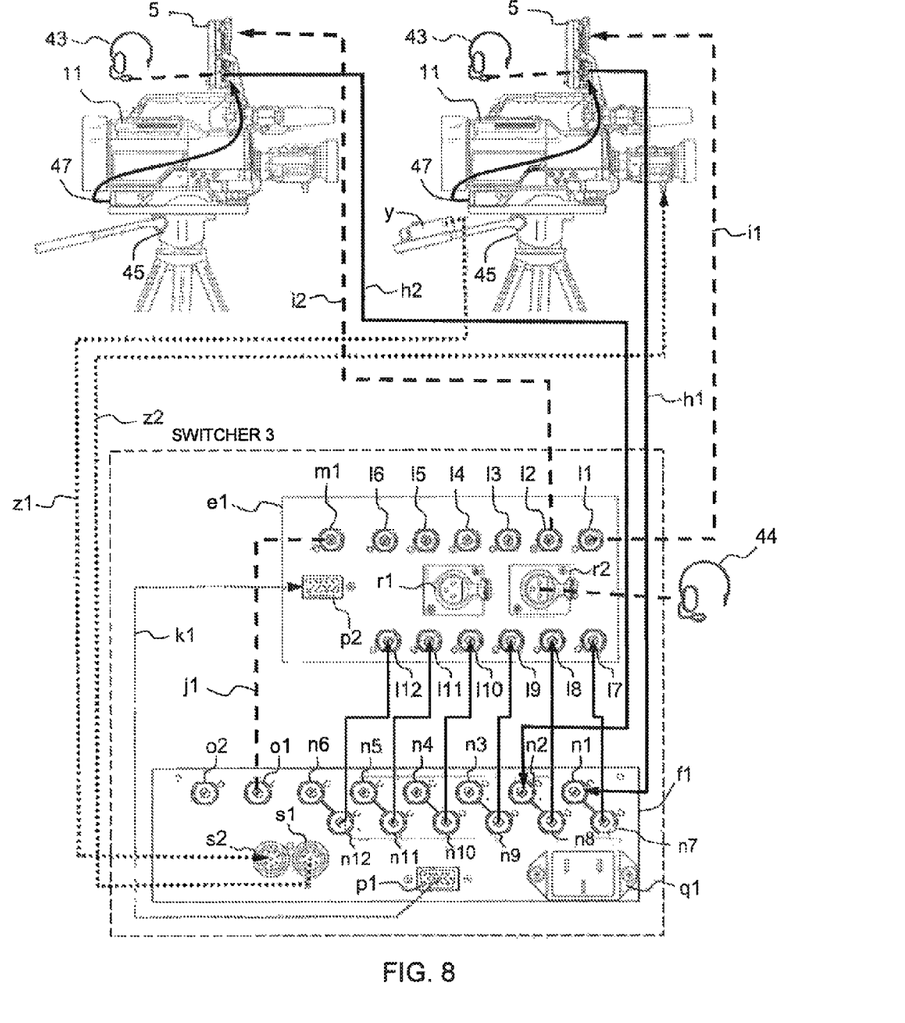
FIG. 8 is a configuration diagram illustrating a specific configuration of the switcher system in FIG. 1.
Figure 9:
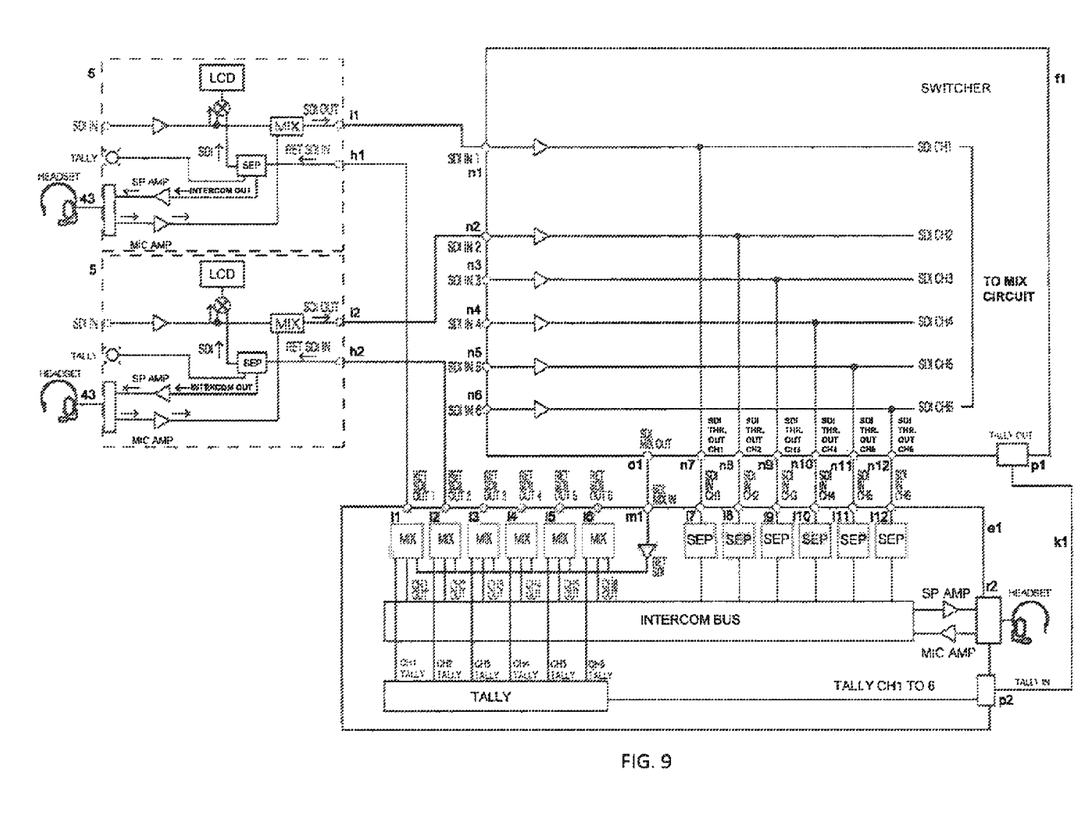
FIG. 9 is a circuit diagram illustrating a specific configuration of the switcher system in FIG. 1.

Firstly, a flow of the signals in the entire switcher system will be described with reference to FIG. 8 to FIG. 9.

The video signal outputted from the video camera 11 (e.g. an HD-SDI video signal) is received by the view finder 5 through the cable 47. The view finder 5 receives an audio signal (intercom audio signal) from the audio input/output unit (intercom headset) 43, and the view finder 5 outputs the video signal having the audio signal superimposed thereon to the switcher 3 through a respective cable h1, h2. Due to the above configuration, the single cable h1, h2 enables the transmission of the video signal and the audio signal, and thereby saving trouble of wiring.

The switcher 3 includes a video selecting unit f1 and a signal mixing unit e1 (conversion box). The video selecting unit f1 has six video signal input connectors n1 to n6. The video signal input connectors n1 to n6 receives, from the view finders 5, the video signals having the audio signals superimposed thereon. The video signals are through outputted by video signal through output connectors n7 to n12. The video signals outputted from the video signal through output connectors n7 to n12 are received by video signal input connectors l7 to l12 of the signal mixing unit e1. The audio signals are separated from the video signals, and are outputted from audio input/output connectors r1, r2 to be received by the audio input/output unit 44. Also, the audio signals (external intercom audio signal, intercom microphone audio signal) from the audio input/output unit 44 are received by the audio input/output connectors r1, r2.

Figure 10:
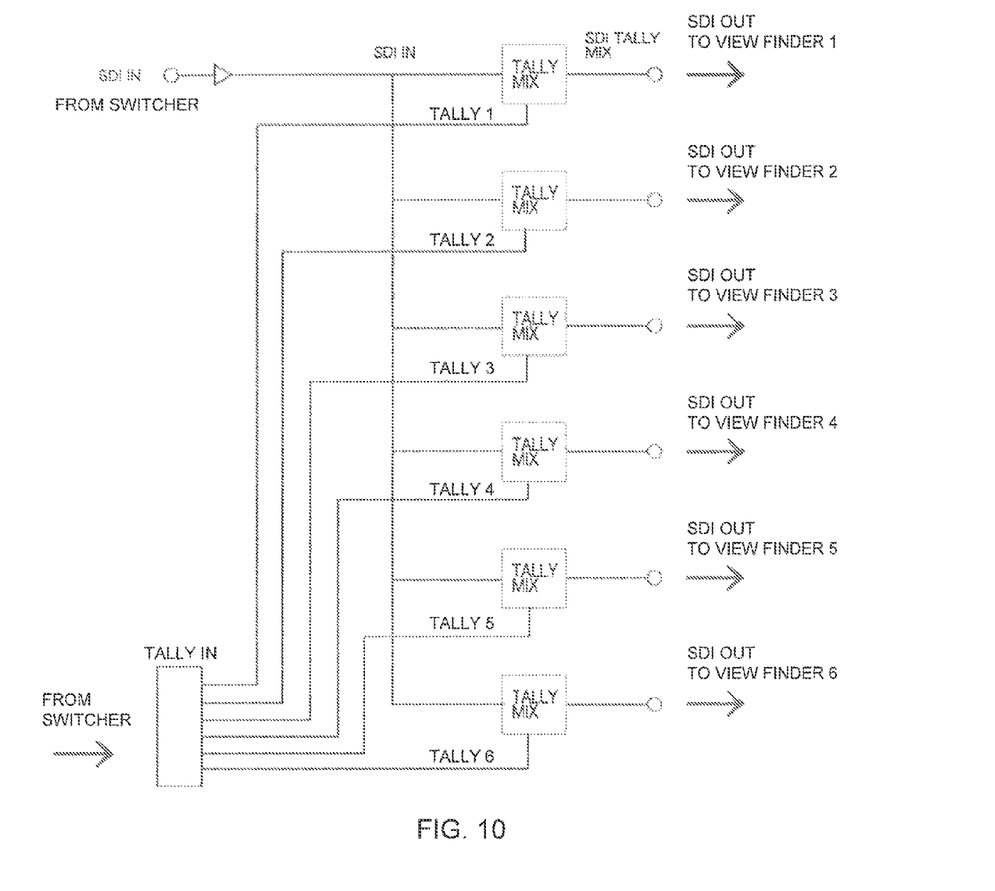
FIG. 10 is a detailed diagram of a superimposing circuit of the tally signal and the SDI signal of the circuit diagram in FIG. 9.
Figure 11:
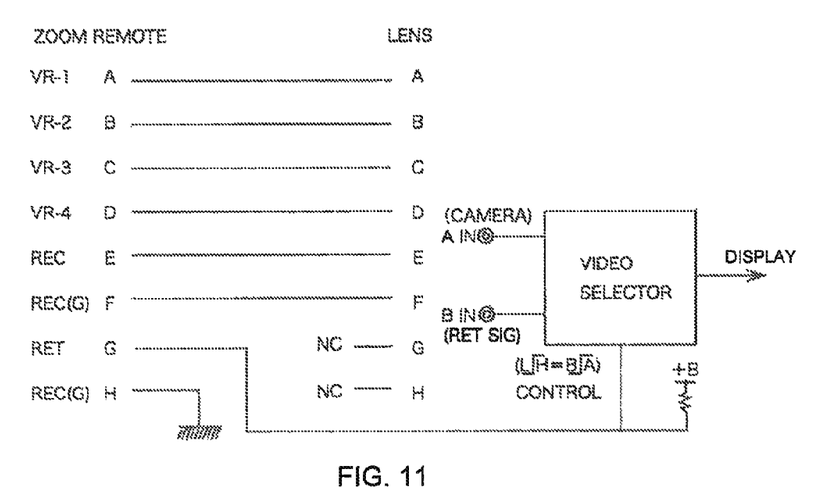
FIG. 11 is a circuit diagram illustrating a configuration of an operation circuit, where the switching of video is executed by a zoom remote controller in the switcher system of one embodiment of the present invention.
Figure 12:
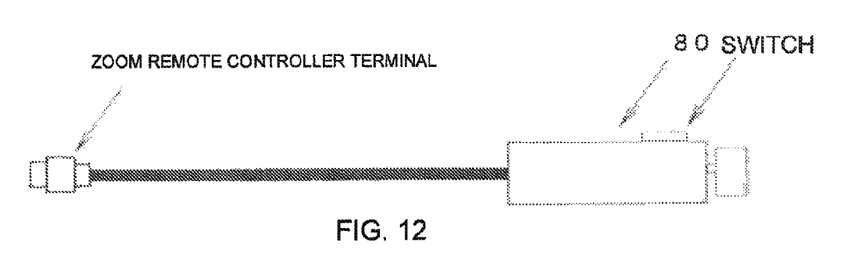
FIG. 12 is a diagram illustrating the zoom remote controller employable in the switcher system of one embodiment of the present invention.
Figure 13:
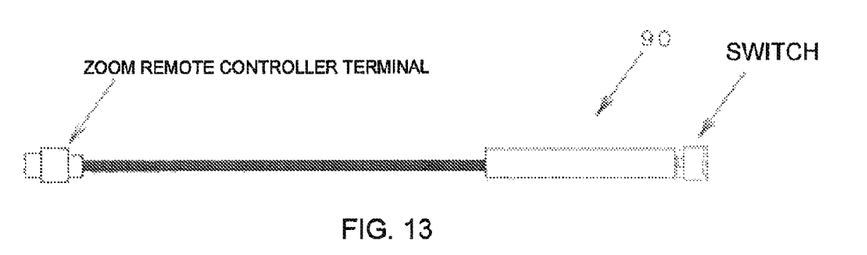
FIG. 13 is a diagram illustrating a pen-type switch employable in the switcher system of one embodiment of the present invention.

The tally signal set by the operation panel shown in FIG. 7 is outputted by a tally signal output connector p1 of the video selecting unit f1, and received by a tally signal input connector p2 of the signal mixing unit e1 through a cable k1. Also, a video signal (program output signal) selected by the video selecting unit f1 is outputted from a selected video output connector o1 of the video selecting unit f1, and is received by a selected video input connector m1 of the signal mixing unit e1 through a cable j1. The received video signals are mixed with the tally signals and the audio signals as shown in FIG. 10, and are outputted from video signal output connectors l1 to l6 of the signal mixing unit e1 to be received by the view finders 5 through the respective cables h1, h2. Due to the above configuration, the single cable i1, i2 enables the transmission of the video signal, the tally signal, and the audio signal, and thereby saving time and trouble of wiring.

Because the view finder does not have the intercom audio in the conventional switcher system, the video camera operator on site had to wire another cable for listening to the return audio or on air audio. According to the configuration of the present embodiment, without wiring the additional cable, it is possible to listen to the return audio or on air audio. Also, it is possible to transmit the tally signal through a single wire.

The control signal from a zoom remote controller y mounted on a pan bar of the video tripod 45 is received by a zoom remote controller input connector s2 through a zoom remote controller cable z1. The zoom remote controller input connector s2 is originally a connector used for mounting a remote controller, which is directly connected to the video camera, on the switcher 3. The examples of the remote controller connected to the zoom remote controller input connector s2 include a remote controller 80 shown in FIG. 12, which outputs, in addition to the return signal, a signal for zoom adjustment and a signal for starting/stopping the recording operation. Also, the examples of the remote controller include a pen-type switch remote controller 90 shown in FIG. 13, which outputs only the return signal. Furthermore, the output (control signal, from which the return signal is removed, see the circuit in FIG. 11) from the zoom remote controller through output connector s1 is received by a zoom remote controller input terminal of a lens of the video camera through a zoom remote controller cable z2.

When the view finder 5 is connected with peripheral equipment, the return signal outputted from the remote controller y is received not by the video camera but by the switcher 3, and thereby the switcher 3 switches the video to be outputted, based on the return signal. Due to the above configuration, it is possible to easily select the video camera, the video of which is to be outputted from the switcher 3, and thereby easily enabling one operator to operate two cameras.

Also, in the present embodiment, there has been described an example, in which the return signal from the zoom remote controller is received by the switcher 3. However, any type of the control signal may be received by the switcher 3. For example, a remote controller having a function similar to that of the operation panel shown in FIG. 7 may be provided near the video camera 11 so that a video camera operator, who is being taking video, is enabled to control the switcher 3. Also, the remote controller may wirelessly transmit the control signal to the switcher 3.

DESCRIPTION OF NUMERALS

1: switcher system
5: view finder
11: video camera
43, 44: audio input/output unit (intercom headset)
45: video tripod
47, h1, h2, i1, i2, j1, k1, z1, z2: cable
48: main body unit
49, 59: tally display unit
51: liquid crystal display unit
53: brightness adjustor
55: contrast adjustor
57: peaking adjustor
61: camera digital video (HD-SDI) output connector
63: camera digital video (HD-SDI) input connector
65: external digital video (return video from switcher, HD-SDI) input connector
67, 69: analog audio connector
71: tally input connector
73: power source (DC) input terminal
e1: signal mixing unit (conversion box)
f1: video selecting unit (switcher connector panel)
l1 to l6: video signal output connector of signal mixing unit e1
l7 to l12: video signal input connector of signal mixing unit e1
m1: selected video input connector
n1 to n6: video signal input connector
n7 to n12: video signal through output connector
o1, o2: selected video output connector
p1: tally signal output connector
p2: tally signal input connector
q1: power source input connector
r1: external intercom connector
r2: intercom headset connector
s1: zoom remote controller output connector
s2: zoom remote controller input connector
t1: power source switch
u1: auto take switch
v1: auto take lever
w1: wipe button
w2: mix button
x1: program row camera 1 selection button
x2: program row camera 2 selection button
x3: program row camera 3 selection button
x4: program row camera 4 selection button
x5: program row camera 5 selection button
x6: preview row camera 6 selection button
y1: preview row camera 1 selection button
y2: preview row camera 2 selection button
y3: preview row camera 3 selection button
y4: preview row camera 4 selection button
y5: preview row camera 5 selection button
y6: preview row camera 6 selection button
80: zoom remote controller
90: pen-type switch
y: zoom remote controller

The invention claimed is:

1. A switcher system comprising a switcher and a plurality of view finders, wherein:
the switcher outputs a digital video signal having a tally signal superimposed thereon;
each of the view finders has:
an external digital video input unit that receives input of the digital video signal, and
a tally display control unit that controls tally display based on the tally signal; and
the switcher has:
a digital video input unit that receives input of a plurality of digital video signals,
a video selecting unit that selects one of the digital video signals received by the digital video input unit,
a signal superimposing unit that superimposes the tally signal, which has an identifier, on the digital video signal selected by the video selecting unit, and
a digital video output unit that outputs the digital video signal having the tally signal superimposed thereon.

2. The system according to claim 1, wherein the identifier corresponds to an identifier of a video camera that outputs the digital video signal.

3. The system according to claim , wherein:
each of the view finders has a storage unit that stores an identifier thereof; and
the tally display control unit turns on the tally display when the identifier of the tally signal coincides with the identifier stored in the storage unit.

4. The system according to claim 1, wherein:
the switcher further has a control signal input unit that receives a control signal; and
the video selecting unit selects the digital video signal based on the control signal.

5. The system according to claim 1, wherein:
the tally signal has emitting color information; and
the tally display control unit controls emitting color of the tally display based on the emitting color information.

6. The system according to claim 1, wherein the digital video signal is an SDI signal.

7. The system according to claim 1, wherein:
the switcher further has an audio input unit that receives input of an audio signal;

the switcher has a signal superimposing unit that superimposes the audio signal on the digital video signal;

the switcher has a digital video output unit that outputs the digital video signal having the tally signal and the audio signal superimposed thereon; and each of the view finders further has an audio output unit that outputs audio based on the audio signal superimposed on the digital video signal.

8. The system according to claim 1, wherein:

each of the view finders has:

a camera digital video input unit that receives input of a digital video signal from a video camera;

an audio input unit that receives input of an audio signal;

a signal superimposing unit that superimposes the audio signal on the digital video signal; and     a camera digital video output unit that outputs the digital video signal having the audio signal superimposed thereon, the switcher further has an audio output unit that outputs audio based on the audio signal superimposed on the digital video signal.

9. The system according to claim 1, wherein the external digital video input unit has a BNC connector.

10. A switcher system comprising a switcher and a plurality of view finders, wherein:

the switcher outputs a digital video signal having a tally signal superimposed thereon; and each of the view finders has:

an external digital video input unit that receives input of the digital video signal,     a tally display control unit that controls tally display based on the tally signal,     a camera digital video input unit that receives input of a digital video signal from a video camera,     a control signal input unit that receives input of a control signal,     a video selecting unit that selects, based on the control signal, one of video based on the digital video signal received from the video camera and video based on the digital video signal received through the external digital video input unit, and     a display control unit that controls display of the video selected by the video selecting unit.

* * * * *